United States Patent
Harada et al.

(10) Patent No.: US 11,637,647 B2
(45) Date of Patent: Apr. 25, 2023

(54) DOWNSTREAM FRAME TRANSFER DEVICE, TRANSFER METHOD AND TRANSFER PROGRAM

(71) Applicant: NIPPON TELEGRAPH AND TELEPHONE CORPORATION, Tokyo (JP)

(72) Inventors: Rintaro Harada, Musashino (JP); Hiroyuki Uzawa, Musashino (JP); Hirotaka Nakamura, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/622,025

(22) PCT Filed: Jun. 25, 2019

(86) PCT No.: PCT/JP2019/025176
§ 371 (c)(1),
(2) Date: Dec. 22, 2021

(87) PCT Pub. No.: WO2020/261388
PCT Pub. Date: Dec. 30, 2020

(65) Prior Publication Data
US 2022/0278765 A1 Sep. 1, 2022

(51) Int. Cl.
*H04B 10/00* (2013.01)
*H04J 14/02* (2006.01)
(Continued)

(52) U.S. Cl.
CPC .......... *H04J 14/0239* (2013.01); *H04L 47/56* (2013.01); *H04L 47/621* (2013.01)

(58) Field of Classification Search
CPC ........ H04J 14/08; H04J 14/086; H04B 10/27; H04B 10/272; H04B 10/275; H04B 10/278
See application file for complete search history.

(56) References Cited

U.S. PATENT DOCUMENTS

2016/0094469 A1* 3/2016 Furusawa .......... H04Q 11/0067
398/47
2016/0261337 A1* 9/2016 Mukai ................ H04B 10/0791

OTHER PUBLICATIONS

3rd Generation Partnership Project;Technical Specification Group Radio Access Network;Study on new radio access technology:Radio access architecture and interfaces (Release 14), 3GPP TR38.801 v14.0.0(Mar. 2017, Mar. 2017.
(Continued)

*Primary Examiner* — Daniel G Dobson (57) ABSTRACT

A transfer device includes: a frame information acquisition unit configured to monitor downstream frames between host devices and OLTs and calculate a statistical value of the downstream frames per a fixed cycle; a frame storage unit configured to store the downstream frames in a plurality of queues; a frame sorting unit configured to input the downstream frames to the queues; and a distribution control unit configured to determine the number of frames to be sequentially input to the queues and increase the number of distributed frames of at least one of the host devices input to an OLT, the OLT having a smaller value of a total number of frames input from all the host devices than a maximum number of rounded frames obtained by dividing a value of a total number of frames input until the frames of all the host devices take turns around the plurality of queues by the number of OLTs. As a result, a delay requirement can be satisfied while a memory size of the queue and power consumption required for the frame sorting process are reduced.

7 Claims, 7 Drawing Sheets

(51) Int. Cl.
*H04L 47/56* (2022.01)
*H04L 47/62* (2022.01)
*H04J 14/00* (2006.01)

(56) References Cited

OTHER PUBLICATIONS

Takehiro Nakamura, Toward the introduction of 5G in 2020, NTT DOCOMO, Inc., 2016.
Iwao Toda, Detailed explanation Network QoS technology, Ohmsha, Ltd., May 25, 2001, pp. 182-183.
Rintaro Harada et al., Downstream Frame Forwarding Method realizing Incremental Upgrade of PON, IEICE General Conference, Mar. 19, 2019.

* cited by examiner

DOWNSTREAM FRAME TRANSFER DEVICE, TRANSFER METHOD AND TRANSFER PROGRAM

CROSS-REFERENCE TO RELATED APPLICATIONS

This application is a 371 U.S. National Phase of International Application No. PCT/JP2019/025176 filed on Jun. 25, 2019. The entire disclosure of the above application is incorporated herein by reference.

TECHNICAL FIELD

The present invention relates to a transfer device, a transfer method, and a transfer program for a downstream frame.

BACKGROUND ART

A network on which frames are transferred between a plurality of host devices and a plurality of subordinate devices is used, for example, in mobile fronthaul (MFH) in a mobile system (e.g., see Non Patent Literature 1). In the MFH, a host device is referred to as an aggregate station, and a subordinate device is referred to as an antenna station, and there is a strict delay requirement (delay time specification) for frame transfer between the aggregate station and the antenna station. For example, a delay upper limit in lower layer split (LLS) that divides a base station function in a physical layer is specified as 250 [μs] (for example, see Non Patent Literature 2).

When a large number of subordinate devices are disposed in such a network, a large number of optical fibers are required between the host devices and the subordinate devices. At the time, in order to efficiently build a network between the plurality of host devices and the plurality of subordinate devices, application of a passive optical network (PON) is conceivable. The PON is an optical communication system including an optical line terminal (OLT), an optical network unit (ONU), and an optical splitter. The OLT is connected to a plurality of ONUs via the optical splitter and one optical fiber connects between the OLT and the optical splitter.

In a case where the PON is applied to a network between a plurality of host devices and a plurality of subordinate devices, when requisition for a band between the host devices and the subordinate devices increases, an optical communication speed in a PON section needs to be increased. Thus, there is conceivable a communication system in which frames are transferred in parallel using a plurality of PONs between the host devices and the subordinate devices. Here, a set of an OLT and ONUs in which frames are transferred in parallel is referred to as a PON-IF. It is conceivable to install a plurality of OLTs to make a plurality of PONs (making a plurality of PON-IFs) and then to transfer signals between host devices and subordinate devices in parallel in the PON-IF group. As a distribution method of an OLT-side transfer device for sorting downstream frames from a host device into a plurality of OLTs, there is known a round robin (RR) method (for example, see Non Patent Literature 3).

CITATION LIST

Non Patent Literature

Non Patent Literature 1: 3GPP TR38.801 v14.0.0 (2017 March), 2017.
Non Patent Literature 2: Takehiro Nakamura, "Toward Introduction to 5G in 2020", pp. 21, MPLS Japan 2016, 2016.
Non Patent Literature 3: Iwao Toda, "Network QoS Technology", pp. 182-183, Ohmsha, Ltd., 2001.
Non Patent Literature 4: Rintaro Harada, et al., "Downlink Transfer Method for Implementing Gradual Speed Upgrade of PON", IEICE General Conference, B-8-26, 2019.

SUMMARY OF THE INVENTION

Technical Problem

On the other hand, in a network including a host device and a subordinate device, downstream frames may be output from the host device to the subordinate device in a burst manner at a fixed cycle. For example, in a mobile system, downstream frames in the MFH are output from an aggregation station to an antenna station in a burst manner at a fixed cycle (e.g., 1 msec), and when a traffic volume of users increases, the number of frames output at the fixed cycle increases. Furthermore, when a speed of wireless communication becomes higher, a frame output speed of the aggregate station becomes higher. In such a case, a network having two host devices and two OLTs (OLT 1 and OLT 2) will be used as an example to describe a problem. In a case where a frame output speed of a host device 1 is greater than a frame output speed of a host device 2, for example, in the host device 1, a frame output speed is high and the number of frames output at a fixed cycle is large, and thus the host device 1 uses the OLT 1 and the OLT 2. On the other hand, in the host device 2, a frame output speed is not high and the number of frames output at the fixed cycle is not large as compared to the host device 1, and thus the host device 2 uses only the OLT 1. Here, when the RR method is applied to an OLT-side transfer device to which the frames from the two host devices are input, an imbalance of the number of accumulated frames is generated between queues for the OLTs included in the OLT-side transfer device. In the above example, frames concentrate in the queue of the OLT 1 to generate a large queuing delay, and the frames stored in the queue cannot satisfy the delay requirement. Furthermore, due to an imbalance of the queuing delay generated by the imbalance of the number of accumulated frames, downstream frames of the host device 1 is input to the ONU-side transfer device that outputs the downstream frames to the subordinate device on the ONU side in a state where the order of frames is disturbed. In the downstream frames of the host device 1 stored in the queue of the OLT 2, a delay (order-controlled delay) for correcting the disturbed order is generated in the ONU-side transfer device, and the delay requirement cannot be satisfied similarly to in the downstream frames stored in the queue of the OLT 1. As described above, when the RR method is applied to the OLT-side transfer device of the related art, frames cannot be distributed in accordance with an actual traffic volume and thus it is difficult to satisfy the delay requirement.

As another method, application of a weighted round robin (WRR) method is conceivable (see, for example, Non Patent Literature 3). The WRR method is basically the same as the RR method, except that values other than 1 and 0 can also be set for the number of frames from a host device input to an OLT-side queue in one round. However, as with the RR method, frames cannot be distributed to each queue in accordance with an actual traffic volume, and thus it is difficult to satisfy the delay requirement.

As yet another method, there is conceivable a method described in Non Patent Literature 4. In the method, a frame sorting process is performed based on a frame transfer time estimated based on a statistical value of a traffic volume, so that transfer of downstream frames satisfying the delay requirement of the MFH is possible. However, in the method of Non Patent Literature 4, although the delay requirement of the MFH is satisfied, depending on a condition, there is generated a problem in which a large memory size is required for the queue, or there is generated a problem in which the number of frames input in one round decreases, a switching frequency of input queues increases, and thus required power increases.

The present invention aims to provide a transfer device, a transfer method, and a transfer program for downstream frames that enable, in a communication system in which parallel transfer is performed using a plurality of PON-IFs between host devices and subordinate devices, frames to be sorted into the plurality of PON-IFs to satisfy a delay requirement of the downstream frames, so that it is possible to reduce a memory size required for a queue and power consumption.

Means for Solving the Problem

A transfer device according to the present invention includes: a frame information acquisition unit configured to monitor, in a communication system to which a network with a PON configuration including a plurality of OLTs between host devices and subordinate devices is applied, downstream frames input from the host devices between the host devices and the OLTs and calculate a statistical value of the downstream frames per a fixed cycle predetermined; a frame storage unit configured to store the downstream frames input from the host devices in a plurality of queues; a frame sorting unit configured to input the downstream frames to the plurality of queues; and a distribution control unit configured to determine the number of frames to be sequentially input to the plurality of queues in the frame sorting process and increase the number of distributed frames of at least one of the host devices input to an OLT, the OLT having a smaller value of a total number of frames input from all the host devices than a maximum number of rounded frames obtained by dividing a value of a total number of frames input until the frames of all the host devices take turns around the plurality of queues by the number of OLTs.

A transfer method according to the present invention includes: a frame information acquisition process of monitoring, in a communication system to which a network with a PON configuration including a plurality of OLTs between host devices and subordinate devices is applied, downstream frames input from the host devices between the host devices and the OLTs and calculating a statistical value of the downstream frames per a fixed cycle predetermined; a frame storage process of storing the downstream frames input from the host devices in a plurality of queues; a frame sorting process of inputting the downstream frames to the plurality of queues; and a distribution control process of determining the number of frames to be sequentially input to the plurality of queues in the frame sorting process and increasing the number of distributed frames of at least one of the host devices input to an OLT, the OLT having a smaller value of a total number of frames input from all the host devices than a maximum number of rounded frames obtained by dividing a value of a total number of frames input until the frames of all the host devices take turns around the plurality of queues by the number of OLTs.

Effects of the Invention

The transfer device, the transfer method, and the transfer program for downstream frames according to the present invention enable, in a communication system in which parallel transfer is performed using a plurality of PON-IFs between a host device and a subordinate device, frames to be sorted into the plurality of PON-IFs to satisfy a delay requirement of the downstream frames, so that it is possible to reduce a memory size required for a queue and power consumption.

DESCRIPTION OF EMBODIMENTS

Embodiments of a frame transfer device, a transfer method, and a transfer program according to the present invention will be described below with reference to the drawings.

Figure 1:
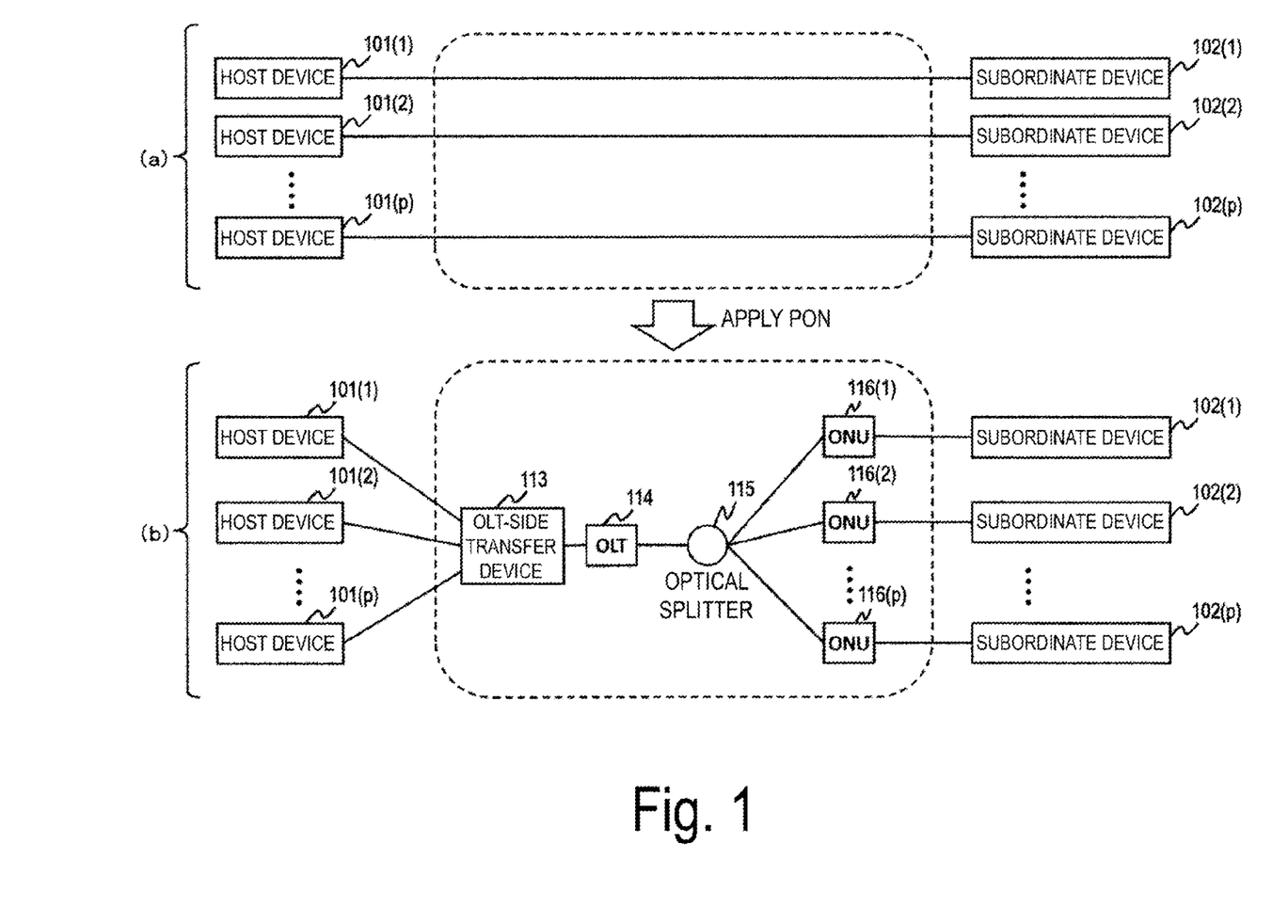
FIG. 1 is a diagram illustrating an example in which a network including a plurality of host devices and a plurality of subordinate devices is formed using a PON.

FIG. 1 illustrates an example in which a network including a plurality of host devices and a plurality of subordinate devices is formed using a PON. In FIG. 1, a system of (a) is configured such that p (p is a positive integer) host devices 101(1) to 101($p$) and p subordinate devices 102(1) to 102($p$) are independently connected by optical fibers, respectively. Examples of such a network include an MFH in a mobile system. In the MFH, a strict delay requirement is specified between a host device called an aggregate station and a subordinate device called an antenna station. In such a network, a large number of optical fibers are required when there are many host devices and subordinate devices. Thus, in order to efficiently build the network, it is conceivable to apply the PON as illustrated in (b). The PON is an optical communication system including an OLT 114, an optical splitter 115, and ONUs 116 and the plurality of host devices 101 are connected via an OLT-side transfer device 113 to the OLT 114. One optical fiber connects between the OLT 114 and the optical splitter 115, and the OLT 114 is connected to each of the plurality of ONUs 116 via the optical splitter 115. The OLT 114 transfers data to each of the ONUs 116 in time division multiple access (TDMA), and each of the ONUs 116 transfers data to the OLT 114 in time division multiplexing (TDM). Thus, even when the OLT 114 and the optical splitter 115 are connected by only one optical fiber, the ONUs 116 can communicate with the OLT 114 without collision of respective pieces of data. In this manner, the plurality of ONUs 116 share one optical fiber in the PON, which is more efficient than directly connecting the OLT 114 to each of the ONUs 116 with one optical fiber.

However, in a case where the PON is applied to the network between the host devices 101 and the subordinate devices 102, when requisition for a band between the host devices 101 and the subordinate devices 102 increases, an optical communication speed in a PON section needs to be increased. For this reason, in the embodiments described below, there will be described a frame transfer device which uses a method in which the PON is made into a multiple-parallel form (e.g., made into multiple wavelengths) and frames are distributed in parallel to be transferred by a plurality of PON-IFs between a plurality of host devices 101 and a plurality of subordinate devices 102, so that downstream frames can be sorted into OLTs of the plurality of PON-IFs so as to satisfy the delay requirement of the downstream frames from the host devices 101 to the subordinate devices 102.

Here, in the description of FIG. 1 and the subsequent drawings, in a case where there are a plurality of similar devices such as the host devices 101 and the subordinate devices 102, when individual devices are specified, description is made by adding (number) to a tail end of a reference numeral, for example, a host device 101(1) and a subordinate device 102(1), and when description is common to a plurality of devices, the description is made by omitting (number) of the tail end of the reference numeral, for example, the host devices 101.

Figure 2:
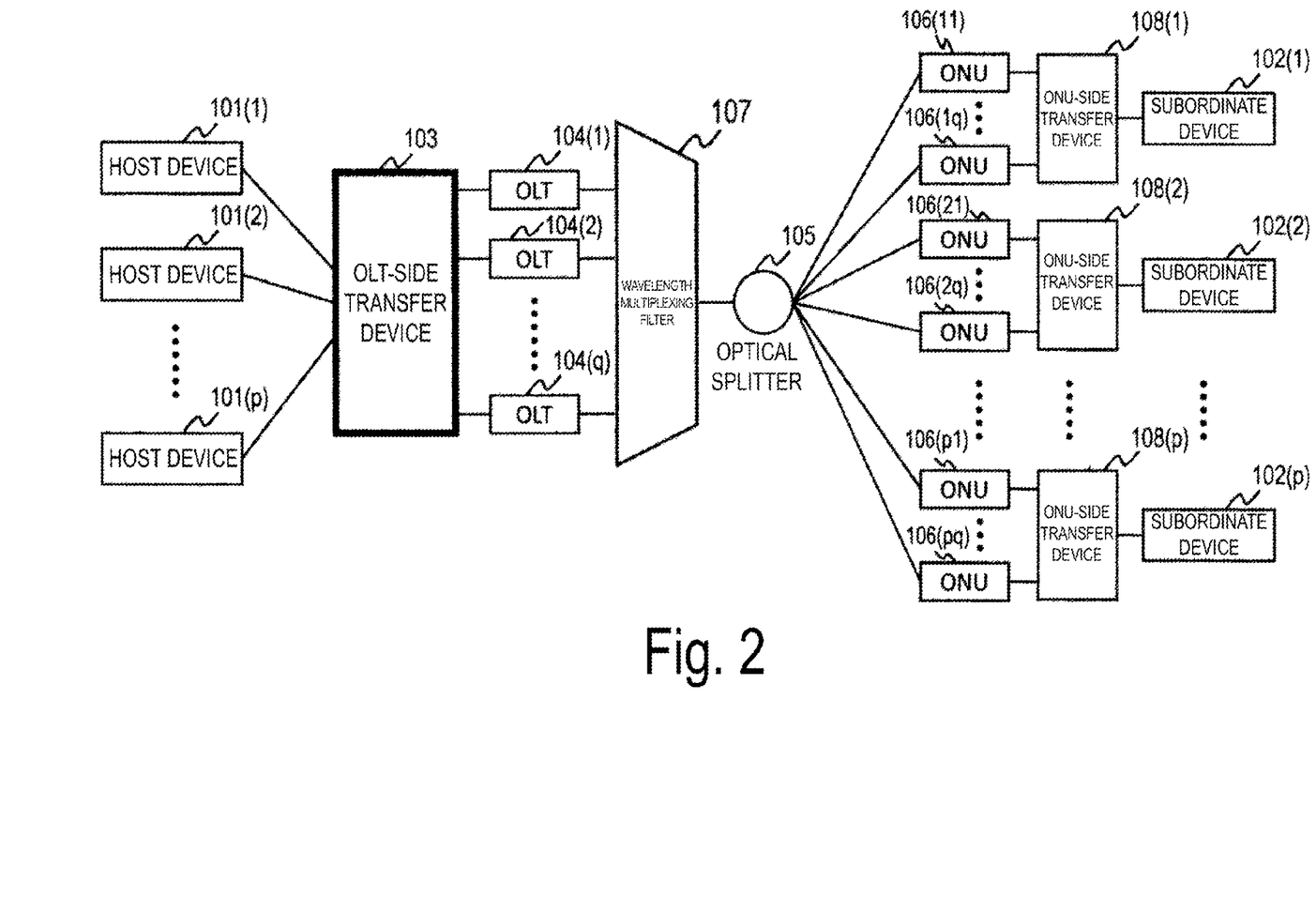
FIG. 2 is a diagram illustrating an example of a network including a plurality of PON-IFs.

FIG. 2 illustrates an example of a network having a plurality of PON-IFs. In FIG. 2, an OLT-side transfer device 103 corresponds to a frame transfer device according to the present invention. In FIG. 2, different wavelengths are used for the PON-IFs and frames between host devices 101 and subordinate devices 102 are distributed and transferred in parallel in a wavelength group including a plurality of wavelengths. This parallel distribution transfer is different from the PON for a single wavelength described in FIG. 1(b) in that a plurality (q (q is a positive integer)) of OLTs 104 are installed, a wavelength multiplexing filter 107 is installed between a group of the plurality of OLTs 104 and an optical splitter 105, and ONU-side transfer devices 108 are installed between ONUs 106 and the subordinate devices 102 (in FIG. 2, although different wavelengths are used for the PON-IFs, a configuration is conceivable in which each PON-IF uses an independent optical fiber and all the PON-IFs use an identical wavelength, and in this case, the wavelength multiplexing filter 107 is not required). Here, a transfer device installed between the host devices 101 and the OLTs 104 is referred to as an OLT-side transfer device 103, and a transfer device installed between the ONUs 106 and a subordinate devices is referred to as an ONU-side transfer device 108. The OLT-side transfer device 103 is a device having a function of distributing and transferring downstream frames to the plurality of OLTs 104, and the ONU-side transfer device 108 is a device having a function of integrating the distributed downstream frames. Moreover, each OLT 104 uses a unique and different wavelength, and each OLT 104 is connected to the plurality of ONUs 106 in a one-to-multiple manner using a unique and different wavelength. Note that the number of ONUs 106 connected to one OLT 104 may vary for each OLT 104. ONUs 106 connected to each subordinate device 102 via the same ONU-side transfer device 108 are connected to the OLT 104 using the same wavelength as that of the ONUs 106.

In FIG. 2, downstream frames from each of the host devices 101 are distributed and transferred in parallel to the plurality of OLTs 104 by the OLT-side transfer device 103. The number of OLTs 104 used by each of the host devices 101 may differ depending on the host devices 101, and the number of ONUs 106 connected to each of the subordinate devices 102 via the ONU-side transfer device 108 may differ depending on the subordinate devices 102. Downstream frames distributed from each of the host devices 101 to the plurality of OLTs 104 are transferred to the ONUs 106 to which each OLT 104 is connected, then integrated by the ONU-side transfer device 108, and received by the corresponding subordinate devices 102. Here, because frames from one host device 101 are distributed and transferred in parallel by a plurality of PON-IFs, there is a possibility that the frames may be out of order (change in the frame transfer order) when they are received by the subordinate devices 102. Because frames need to be transferred to the subordinate devices 102 in the order in which they are output by the host devices 101, the OLT-side transfer device 103 and the ONU-side transfer devices 108 perform frame order control. Thus, the OLT-side transfer device 103 gives a sequence number to each of the frames input from the host devices 101 and transfers the frames. Then, the ONU-side transfer devices 108 refers to the sequence numbers of the frames input from the plurality of connected ONUs 106, arranges the frames in the order of the sequence numbers, and outputs the frames to the subordinate devices 102.

Here, an OLT-side transfer device 113 of Comparative Example will be first described in order to facilitate understanding of features of the OLT-side transfer device 103 before the embodiments of the OLT-side transfer device 103 are described.

OLT-Side Transfer Device 113 of Comparative Example

Figure 3:
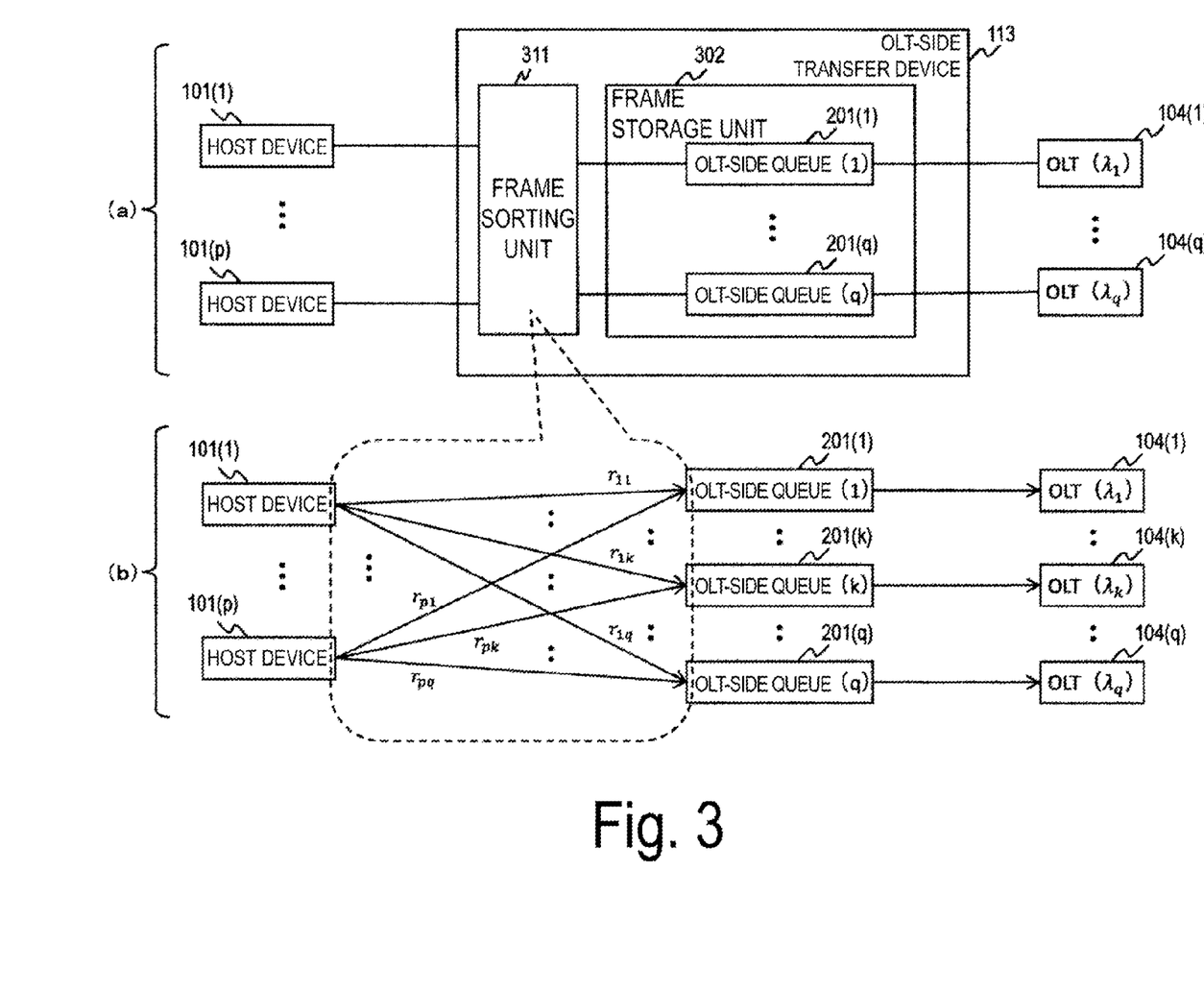
FIG. 3 is a diagram illustrating a configuration of an OLT-side transfer device and an example of a frame sorting process of Comparative Example.

FIG. 3 illustrates a configuration of the OLT-side transfer device 113 of Comparative Example and an example of a frame sorting process. Note that the overall configuration of the system of Comparative Example is the same as the system of FIG. 2, except that the OLT-side transfer device 103 in FIG. 2 is replaced with the OLT-side transfer device 113 of Comparative Example.

In FIG. 3, a system of (a) illustrates a configuration example of the OLT-side transfer device 113 of Comparative Example, and the OLT-side transfer device 113 includes a frame sorting unit 311 and a frame storage unit 302. (b) illustrates a processing example of the frame sorting unit 311, and downstream frames of host devices 101(1) to 101(q) are sorted into q queues (OLT-side queues 201(1) to 201(q)) of a frame storage unit 302 in the RR method. Here, q is the number of the OLTs 104.

The frame sorting unit 311 identifies which host device 101 the frame input to the OLT-side transfer device 113 is from. A unique value (e.g., a VLAN identifier (VID)) is used to identify each of the plurality of host devices 101. Next, the frame sorting unit 311 gives a sequence number to a frame input from each of the host devices 101. Furthermore, the frame sorting unit 311 inputs frames from the host devices 101 into the OLT-side queues 201 in the frame storage unit 302 in the RR method in order based on a preset number of frames $r_{ik}$ (k is an integer from 1 to q and i is an integer from 1 to p). The WRR method is basically the same as the RR method, except that values other than 1 and 0 can also be set for the number of frames $r_{ik}$ from a host device 101($i$) input to an OLT-side queue 201($k$). Note that each value of $r_{ik}$ is assumed to be set in advance.

In FIG. 3, the number of frames from the host device 101($i$) (1≤i≤p, p is the number of the host devices 101) input to the k-th OLT-side queue 201($k$) (1≤k≤q) in one round (cycle in which the host device 101 inputs frames once to every OLT-side queue 201, the number of the OLT-side queues 201 being equal to the number of the OLTs 104) in the RR method is $r_{ik}$ (1 or 0 which is the number of frames from the host device 101($i$) input to the OLT-side queue 201($k$) in one round). For example, $r_{ik}$ is equal to 1 when the host device 101($i$) uses a wavelength $\lambda_k$, and $r_{ik}$ is equal to 0 when the host device 101($i$) does not use the wavelength λk. Here, whether the host device 101($i$) uses the wavelength $\lambda_k$ is assumed to be set in advance. In addition, frames stored in the k-th OLT-side queue 201($k$) are transferred to the k-th OLT 104($k$) (the OLT 104 using the wavelength $\lambda_k$). The frames of the host device 101($i$) transferred to the OLT 104($k$) are transferred toward a destination ONU 106 using the wavelength $\lambda_k$. For example, in the case of FIG. 2, the frames of the host device 101($i$) transferred to the OLT 104($k$) are transferred to a destination ONU 106($ik$) using the wavelength 4 and received by a subordinate device 102($i$) via an ONU-side transfer device 108($i$).

Here, in a network including a host device 101 and a subordinate device 102, in an application (for example, a mobile system) in which downstream frames are output from the host device 101 to the subordinate device 102 in a burst manner at each fixed cycle, downstream frames in the MFH are output from an aggregate station (host device) to an antenna station (subordinate device) in a burst manner at the fixed cycle (e.g., 1 [ms]). At this time, when a traffic volume of users increases, the number of frames output at the fixed cycle increases. Further, as a speed of wireless communication becomes higher, a frame output speed from the aggregate station becomes higher.

For example, a case is considered in which in a network in which the number of host devices 101 is two (a host device 101(1) and a host device 101(2)) and the number of OLTs (number of wavelengths) is 2 ($\lambda_1$ and $\lambda_2$), a frame output speed of the host device 101(1) is higher than a frame output speed of the host device 101(2). The host device 101(1) uses the wavelength $\lambda_1$ and the wavelength $\lambda_2$ because the frame output speed is high and the number of frames output at each fixed cycle is large. On the other hand, the host device 101(2) uses only the wavelength $\lambda_1$ because the frame output speed is not high and the number of frames output at the fixed cycle is not large in comparison to the host device 101(1). When the RR method is applied to the OLT-side transfer device 113 to which frames from the two host devices 101 are input, the frames from the host device 101(1) are input to the OLT-side queue 201(1) and the OLT-side queue (2) in the RR method. Thus, the frames that are output from the host device 101(1) at the fixed cycle are stored alternately in half in the OLT side queue 201(1) and the OLT side queue 201(2). Note that the frame from the host device 101(2) is input to only the OLT-side queue 201(1). In other words, imbalance of the number of accumulated frames is generated among the OLT-side queue 201(1) to the OLT-side queue 201($q$). In this state, frames are concentrated in the OLT-side queue 201(1) to generate a large queuing delay, and thus the frames stored in the OLT-side queue 201(1) cannot satisfy the delay requirement.

In addition, the frame from the host device 101(1) and the frame from the host device 101(2) stored in the OLT-side queue 201(1) are transferred to the OLT 104(1) using the wavelength $\lambda_1$, and the frame from the host device 101(1) stored in the OLT-side queue (2) is transferred to the OLT 104(2) using the wavelength $\lambda_2$. At this time, while the frame from the host device 101(1) and the frame from the host device 101(2) are transferred on the path of the wavelength $\lambda_1$, only the frame from the host device 101(1) is transferred on the path of the wavelength $\lambda_2$. Thus, imbalance of the number of accumulated frames is generated among the OLT-side queue 201(1) to the OLT-side queue 201($q$). Then, due to an imbalance of queuing delays generated by the imbalance of the number of accumulated frames among the OLT-side queue 201(1) to the OLT-side queue 201($q$), the frames of the host device 101(1) are input to the ONU-side transfer device 108 in a state where the frames are out of order.

Figure 4:
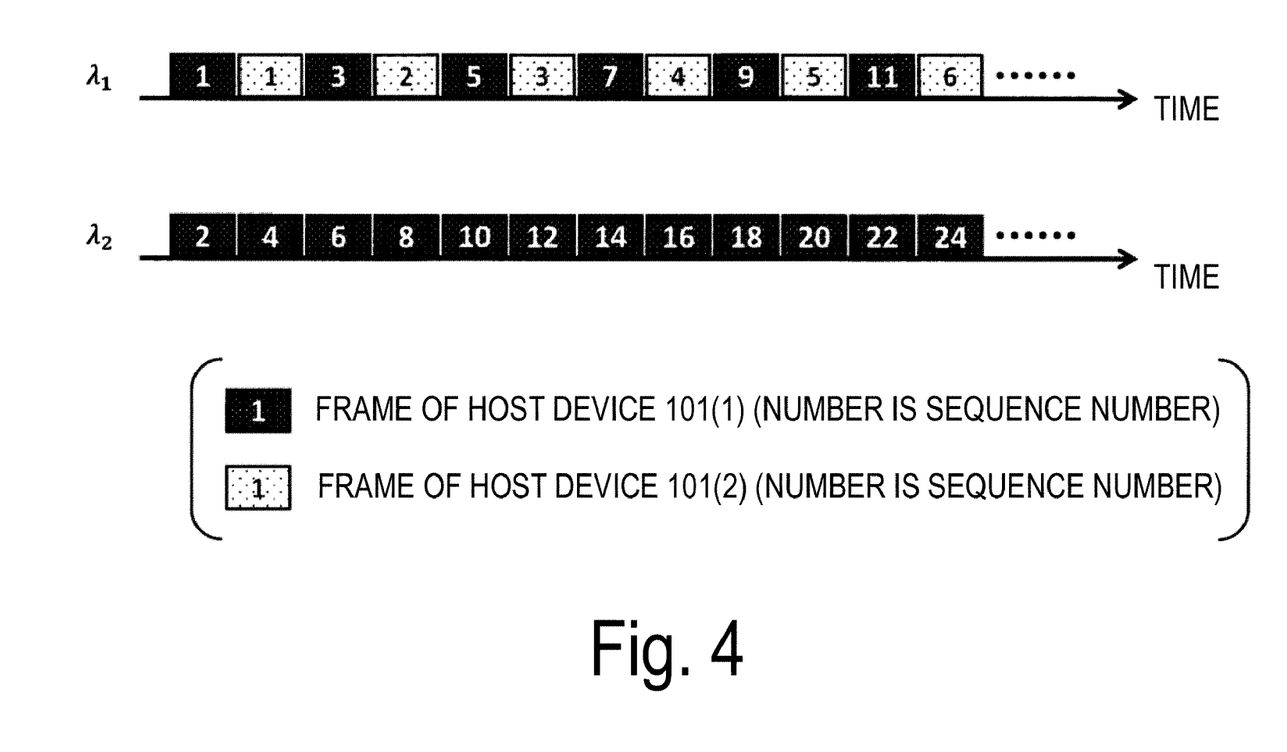
FIG. 4 is a diagram illustrating an example of a state in which frames are out of order.

FIG. 4 illustrates an example of a state in which frames are out of order. Note that, in FIG. 4, the frames with outline sequence numbers on black background indicate frames of the host device 101(1), and the frames with black sequence numbers indicate frames of the host device 101(2).

Here, it is assumed in FIG. 4 that the frames of the host device 101(1) are transferred to the OLT 104(1) using the wavelength $\lambda_1$ and the OLT 104(2) using the wavelength $\lambda_2$, and the frames of the host device 101(2) are transferred to the OLT 104(1) using the wavelength $\lambda_1$. At this time, because the OLT 104(1) of the wavelength $\lambda_1$ transfers the frames from both the host device 101(1) and the host device 101(2), the transfer time thereof is longer than that of the OLT 104(2) of the wavelength $\lambda_2$ that transfers only the frames of the host device 101(1) and the frames are input to the ONU-side transfer device 108 in a state where the frames are out of order. For example, in the case of FIG. 4, the frames with the sequence numbers 8, 10, and 12 arrive at the ONU-side transfer device 108 earlier than the frame with the sequence number 7 of the host device 101(1), and thus the frames become out of order.

In this case, in order to output the frames to the subordinate devices 102 by maintaining the frame order as the order of the frames output (e.g., the order of the sequence numbers) from the host devices 101, the ONU-side transfer device 108 retains the frame with the sequence number j (j is a positive integer) in a buffer until a frame with the sequence number j−1 is output. Here, the time period in which the frame is retained in the buffer is referred to as "order-controlled delay". Order-controlled delay occurs when frames cannot be distributed to multiple wavelengths according to an actual traffic volume. When order-controlled delay occurs, it is difficult for all host devices 101 to meet delay requirements (transferring all frames within a delay upper limit).

In addition, an application of a WRR method is also conceivable in addition to the RR method, but frames are distributed in a plurality of wavelengths according to the preset number of frames $r_{ik}$ in the WRR method, and it is not possible to set the number of frames $r_{ik}$ in accordance with an actual traffic volume, unlike in the RR method.

As described above, in the OLT-side transfer device 113 of Comparative Example, frames cannot be distributed in accordance with an actual traffic volume, imbalance of the number of accumulated frames is generated among queues, and a large queuing delay is generated in the queue in which the frames are concentrated, so that the delay requirement cannot be satisfied. In addition, due to an imbalance of queuing delays generated by the imbalance of the number of accumulated frames, the frames are input to the ONU-side transfer device 108 in a state where the frames are out of order and a large order-controlled delay is generated for frames input to a queue other than the queue in which the frames are concentrated. As a result, the delay requirement cannot be satisfied in all the queues, which is a problem.

In contrast, in order to satisfy the delay requirement, the OLT-side transfer device 103 illustrated in FIG. 5 described later determines the number of frames to be input to each queue in one round in which a plurality of queues take turns in accordance with a traffic volume output by the host devices 101, and performs control to distribute the frames so that all the frames satisfy the delay requirement. Here, the number of frames input in one round is referred to as "the number of distributed frames". Note that a method of calculating the number of distributed frames will be described below in detail.

Figure 5:
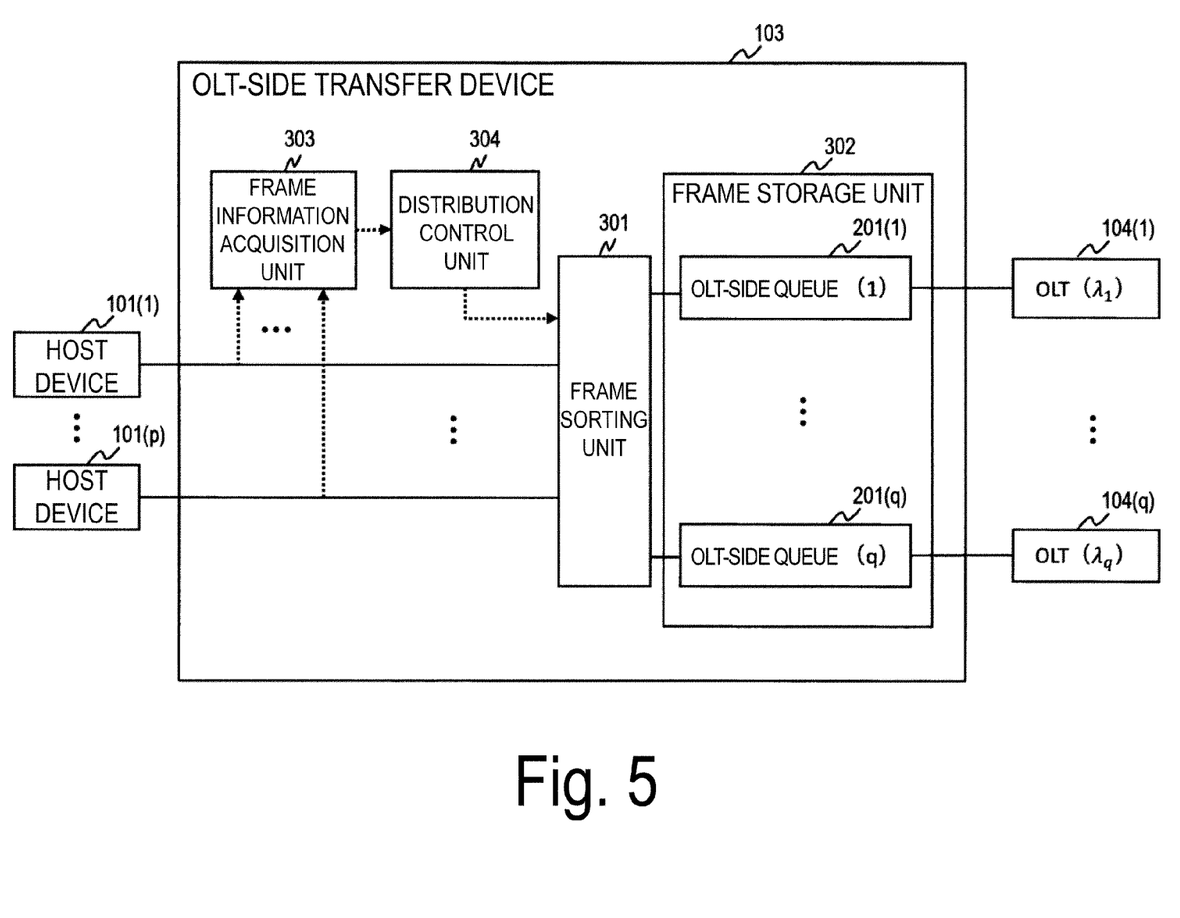
FIG. 5 is a diagram illustrating an example of a configuration of an OLT-side transfer device illustrated in FIG. 2.

FIG. 5 illustrates a configuration example of the OLT-side transfer device 103 illustrated in FIG. 2. In FIG. 5, the OLT-side transfer device 103 corresponds to the OLT-side transfer device 113 of Comparative Example illustrated in FIG. 3, but has a frame information acquisition unit 303 and a distribution control unit 304, which is a different point from Comparative Example.

In FIG. 5, the OLT-side transfer device 103 includes the frame sorting unit 301, the frame storage unit 302, the frame information acquisition unit 303, and the distribution control unit 304.

The frame sorting unit 301 identifies which host device 101 the frame input to the OLT-side transfer device 103 is from. A unique value (e.g., a VID) is used to identify each of the plurality of host devices 101. Next, the frame sorting unit 301 gives a sequence number to a frame input from each host device 101. Although the processing so far is basically similar to that of the OLT-side transfer device 113 of Comparative Example, there is a difference in that the number of distributed frames calculated by the distribution control unit 304, which will be described below, is used for the number of frames input to each queue in the frame storage unit 302 in one round, rather than a preset value. Then, the frame sorting unit 301 outputs the frames from the host devices 101 to the queues included in the frame storage unit 302 based on the number of distributed frames (which corresponds to a frame sorting process).

The frame storage unit 302 is configured similarly to the OLT-side transfer device 113 of Comparative Example and includes the same number of queues (from the OLT-side queue 201(1) to the OLT-side queue 201(q)) as the number of OLTs q. Then, an OLT-side queue 201 to which a frame is to be input is determined by the frame sorting unit 301, the frame is stored in the determined queue, and the frame is output to an OLT 104 to which the queue is connected (which corresponds to a frame storage process).

The frame information acquisition unit 303 monitors the number of frames output from each of the p host devices 101 and the frame sizes (which corresponds to a frame information acquisition process). Note that, with respect to the number of frames, a statistical value of the number of frames per monitoring cycle is calculated based on the monitoring result for each predetermined fixed cycle (referred to as a "monitoring cycle"). The statistical value is, for example, the average of the number of frames in multiple monitoring cycles. On the other hand, with respect to the frame sizes, the maximum frame sizes observed within the monitoring cycles are retained and a statistical value of the maximum frame sizes per monitoring cycle is further calculated. The statistical value is, for example, an average of the maximum frame sizes in multiple monitoring cycles.

The distribution control unit 304 calculates the number of frames (the number of distributed frames) input by the frame sorting unit 301 (in one round) when the plurality of OLT-side queues 201 included in the frame storage unit 302 take turns (which corresponds to a distribution control process). Specifically, the distribution control unit 304 first determines the maximum value per one wavelength of the number of frames to be transferred at wavelengths in one round (referred to as "the maximum number of rounded frames") and then, based on the determined maximum number of rounded frames, determines the number of distributed frames based on a statistical value of a traffic volume (e.g., the number of frames) of the host devices 101. Here, an update cycle of the maximum number of rounded frames and the number of distributed frames is set to the same length as the monitoring cycle of the frame information acquisition unit.

Method for Calculating Maximum Number of Rounded Frames and Number of Distributed Frames Next, a method for calculating the maximum number of rounded frames and the number of distributed frames by the distribution control unit 304 will be described in detail.

The distribution control unit 304 first determines the maximum number of rounded frames N (N is a positive integer) to satisfy the following equation (1). Note that the maximum number of rounded frames N is a minimum integer greater than the number obtained by dividing a total number of frames input by all the host devices 101 until the frames take turns around the plurality of OLT-side queues 201 by the number of OLTs 104.

[Math. 1]

$$N = \left\lceil \frac{1}{q} \sum_{i=1}^{p} \left\lceil \frac{NR_i n_i s}{(n_i - 1)Bs + yBR_i - (N-1)R_i s} \right\rceil \right\rceil \quad (1)$$

($\lceil x \rceil$ indicates a minium integer of $x$ or greater)

Based on the determined maximum number of rounded frames N, the distribution control unit 304 determines the number of frames (the number of distributed frames $r_{ik}$) from the host device 101(i) to be input in one round to the OLT-side queue 201(k) to satisfy the following equation (2). The distribution control unit 304 repeatedly executes the procedure at each monitoring cycle of the frame information acquisition unit 303.

[Math. 2]

$$\sum_{k=1}^{q} r_{ik} = \left\lceil \frac{NR_i n_i s}{(n_i - 1)Bs + yBR_i - (N-1)R_i s} \right\rceil \quad (2)$$

Here, the variables of the equations (1) and (2) are as follows.
p: Number of host devices 101
i: Host device 101 number
q: Number of OLTs 104 (number of wavelengths)
k: OLT 104 number (wavelength number)
N: Maximum number of rounded frames
s: Statistical value of maximum frame size [bit]
$n_i$: Statistical value of the number of frames per monitoring cycle of the host device 101(i)
$R_i$: Frame output speed (line rate) of the host device 101(i) [bps]
B: Optical communication speed per wavelength (bps)
y: Delay upper limit [s]

$r_{ik}$: Number of frames (number of distributed frames) input in one round to a queue (OLT-side queue (k)) corresponding to the OLT 104(k) among frames of the host device 101(i)

Here, in the equations (1) and (2), the number of host devices 101 p, the number of OLTs 104 (the number of wavelengths) q, the maximum number of rounded frames N, the statistical value of the maximum frame sizes s, the optical communication speed B, and the delay upper limit y are values that are not dependent on the host devices 101. On the other hand, the statistical value $n_i$ of the number of frames and the frame output speed $R_i$ per monitoring cycle of the host device 101(i) (1≤i≤p) may differ depending on the host devices 101. Moreover, the individual frame sizes, number of frames, optical communication speed B, and frame output speed $R_i$ are values that are systematically determined. Note that, for the delay upper limit y, a value systematically determined may be used, or a value determined in advance based on a value determined systematically may be used. In addition, although a value common for all of the host devices 101 (all of the subordinate devices 102) is used for the delay upper limit y in the present embodiment, the delay upper limit y may differ depending on each host device 101 (each subordinate device 102) or each ONU.

In this way, based on the equations (1) and (2), the distribution control unit 304 determines the number of distributed frames $r_{ik}$ from the host device 101(i) to be input in one round to the OLT-side queue 201(k). Note that, a process of deriving the equations (1) and (2) is the same as in Non Patent Literature 4 and thus the description thereof will be omitted.

The process as far corresponds to the process described in Non Patent Literature 4, but the embodiments described hereinafter are different from Non Patent Literature 4 in that control is performed such that a value of the number of distributed frames of a specified host device 101 is increased in accordance with conditions between the maximum number of rounded frames N and the number of distributed frames $r_{ik}$. As a result, the OLT-side transfer device 103 according to the embodiments reduces the imbalance of the number of frames among queues to reduce a memory size required for the queues, and prevents the number of frames input in one round from decreasing to suppress increase of a switching frequency of input queues, so that the required power can be saved.

Conditions Between Maximum Number of Rounded Frames N and Number of Distributed Frames $r_{ik}$ Next, a method of performing control such that a value of the number of distributed frames of a specific host device 101 is increased in accordance with conditions between the maximum number of rounded frames N and the number of distributed frames $r_{ik}$ will be described.

When the maximum number of rounded frames N is determined to satisfy the equation (1) and the number of distributed frames $r_{ik}$ is determined to satisfy the equation (2) under the determined N, an equation (3) holds between the maximum number of rounded frames N and the number of distributed frames $r_{ik}$.

[Math. 3]

$$N = \left\lceil \frac{1}{q}\sum_{i=1}^{p}\sum_{k=1}^{q} r_{ik} \right\rceil \quad (3)$$

Then, the equation (3) can be divided into an equation (4) and a relationship (5).

[Math. 4]

$$N = \frac{1}{q}\sum_{i=1}^{p}\sum_{k=1}^{q} r_{ik} \quad (4)$$

[Math. 5]

$$N - 1 < \frac{1}{q}\sum_{i=1}^{p}\sum_{k=1}^{q} r_{ik} < N \quad (5)$$

Here, when the equation (4) holds, the number of frames input in one round to each of the OLT 104(1) to the OLT 104(q) is N.

On the other hand, when the relationship (5) holds, there is an OLT 104 to which only a smaller number of frames than N are input in one round. As a result, as compared to a case of the equation (4) in which N frames are input to each of the OLTs 104 in one round, the number of rounds required to transfer traffic from the host devices 101 is increased, and frames are concentrated in an OLT 104 to which N frames are input in one round. Thus, a queue corresponding to the OLT 104 (OLT-side queue 201) requires a large memory size. In addition, the number of frames input in one round is reduced as compared to the case where the equation (4) holds, and thus a frequency of switching input queues increases, which leads to a problem in which a required power increases.

Accordingly, in a case where the relationship (5) holds, the OLT-side transfer device 103 according to each of the embodiments described below performs control so as to increase the number of distributed frames $r_{ik}$ of a specific host device 101 so that the equation (4) holds.

In this way, the OLT-side transfer device 103 according to each of the embodiments calculates the number of distributed frames in accordance with the conditions between the maximum number of rounded frames and the number of distributed frames. As a result, the OLT-side transfer device 103 can sort frames into the plurality of PON-IFs so as to satisfy the delay requirement of downstream frames to reduce the memory size required for the queues and power consumption.

First Embodiment

After the maximum number of rounded frames N and the number of distributed frames $r_{ik}$ are determined, when the relationship (5) holds between the maximum number of rounded frames N and the number of distributed frames $r_{ik}$, a distribution control unit 304 of an OLT-side transfer device 103 according to a first embodiment increases the number of distributed frames $r_{ik}$ so as to satisfy the equation (4), so that a memory size and power consumption required to sort frames can be reduced. Note that a frame sorting unit 301, a frame storage unit 302, and a frame information acquisition unit 303 operate in the same manner as described above.

The distribution control unit 304 according to the present embodiment first determines the maximum number of rounded frames N to satisfy the equation (1), and determines the number of distributed frames $r_{ik}$ to satisfy the equation (2) under the determined N. Next, it is determined which a relationship between the maximum number of rounded frames N and the number of distributed frames $r_{ik}$ is as the equation (4) or as the relationship (5). As a result of the determination, when the equation (4) holds, the value of the number of distributed frames $r_{ik}$ is kept as is. On the other hand, when the relationship (5) holds, the number of distributed frames to be increased so as to satisfy the equation (4) is calculated in each PON-IF (OLT 104). Here, the number of distributed frames to be increased so as to satisfy the equation (4) in a PON-IF (k) (OLT 104(k)) can be calculated by an expression (6).

[Math. 6]

$$N - \sum_{i=1}^{p} r_{ik} \qquad (6)$$

If the expression (6) becomes 0 in all the PON-IFs (k) (1≤k≤q), the equation (4) can be satisfied.

At this time, a host device 101 with a minimum traffic volume among the host device 101(1) to the host device 101(p) is set as a host device 101 in which the number of distributed frames to the PON-IF (k) is to be increased by the value calculated by the expression (6).

In this way, the distribution control unit 304 of the OLT-side transfer device 103 according to the first embodiment can sort frames so as to reduce a required memory size and power consumption.

Second Embodiment

A distribution control unit 304 of an OLT-side transfer device 103 according to a second embodiment is different from that of the first embodiment in a way of determining a host device 101 in which the number of distributed frames is to be increased in a case where the relationship (5) holds between the maximum number of rounded frames N determined to satisfy the equation (1) and the number of distributed frames $r_{ik}$ determined to satisfy the equation (2). In the present embodiment, a host device 101 in which the number of distributed frames $r_{ik}$ determined to satisfy the equation (2) is the smallest among the host device 101(1) to the host device 101(p) is set as the host device 101 in which the number of distributed frames to a PON-IF(k) is to be increased by a value calculated by the expression (6).

In this way, the distribution control unit 304 of the OLT-side transfer device 103 according to the second embodiment can sort frames so as to reduce the required memory size and power consumption.

Third Embodiment

A distribution control unit 304 of an OLT-side transfer device 103 according to a third embodiment is different from the first embodiment and the second embodiment in a way of determining a host device 101 in which the number of distributed frames is to be increased in a case where the relationship (5) holds between the maximum number of rounded frames N determined to satisfy the equation (1) and the number of distributed frames $r_{ik}$ determined to satisfy the equation (2). In the present embodiment, one host device 101 selected randomly among the host device 101(1) to the host device 101(p) is set as a host device 101 in which the number of distributed frames to a PON-IF(k) is to be increased by a value calculated by the expression (6).

In this way, the distribution control unit 304 of the OLT-side transfer device 103 according to the third embodiment can sort frames so as to reduce the required memory size and power consumption.

Fourth Embodiment

A distribution control unit 304 of an OLT-side transfer device 103 according to a fourth embodiment is different from the first to third embodiments in a way of determining a host device 101 in which the number of distributed frames is to be increased in a case where the relationship (5) holds between the maximum number of rounded frames N determined to satisfy the equation (1) and the number of distributed frames $r_{ik}$ determined to satisfy the equation (2). While in the first to third embodiments, the number of distributed frames is to be increased in only one host device 101, in the present embodiment, in a case where a relationship (7) is satisfied, the number of distributed frames to the PON-IF (k) of each of $d_k$ host devices 101 randomly selected is increased by one.

[Math. 7]

$$N - \sum_{i=1}^{p} r_{ik} = d_k \leq p \qquad (7)$$

Furthermore, in a case where a relationship (8) is satisfied, the number of distributed frames to the PON-IF (k) of all the host devices 101 is increased by one.

[Math. 8]

$$N - \sum_{i=1}^{p} r_{ik} = d_k > p \qquad (8)$$

Then, after the increasing process, if $d_k$ is larger than p, the increasing process is repeatedly performed, and if $d_k$ is equal to or less than p, the number of distributed frames to the PON-IF (k) of each of the $d_k$ host devices 101 randomly selected is increased by one.

Note that, in the distribution control unit 304, the way of determining a host device 101 in which the number of distributed frames is to be increased when the relationship (5) holds between the maximum number of rounded frames N determined so as to satisfy the equation (1) and the number of distributed frames $r_{ik}$ determined to satisfy the equation (2) is not limited to the first to fourth embodiments, and can be changed without deviating from the present invention. For example, a host device 101 having the maximum traffic volume may be determined, or a host device 101 having the largest number of distributed frames $r_{ik}$ may be determined.

In addition, each OLT-side queue 201 in the frame storage unit 302 in the OLT-side transfer device 103 may be provided in each OLT 104, rather than in the OLT-side transfer device 103.

Figure 6:
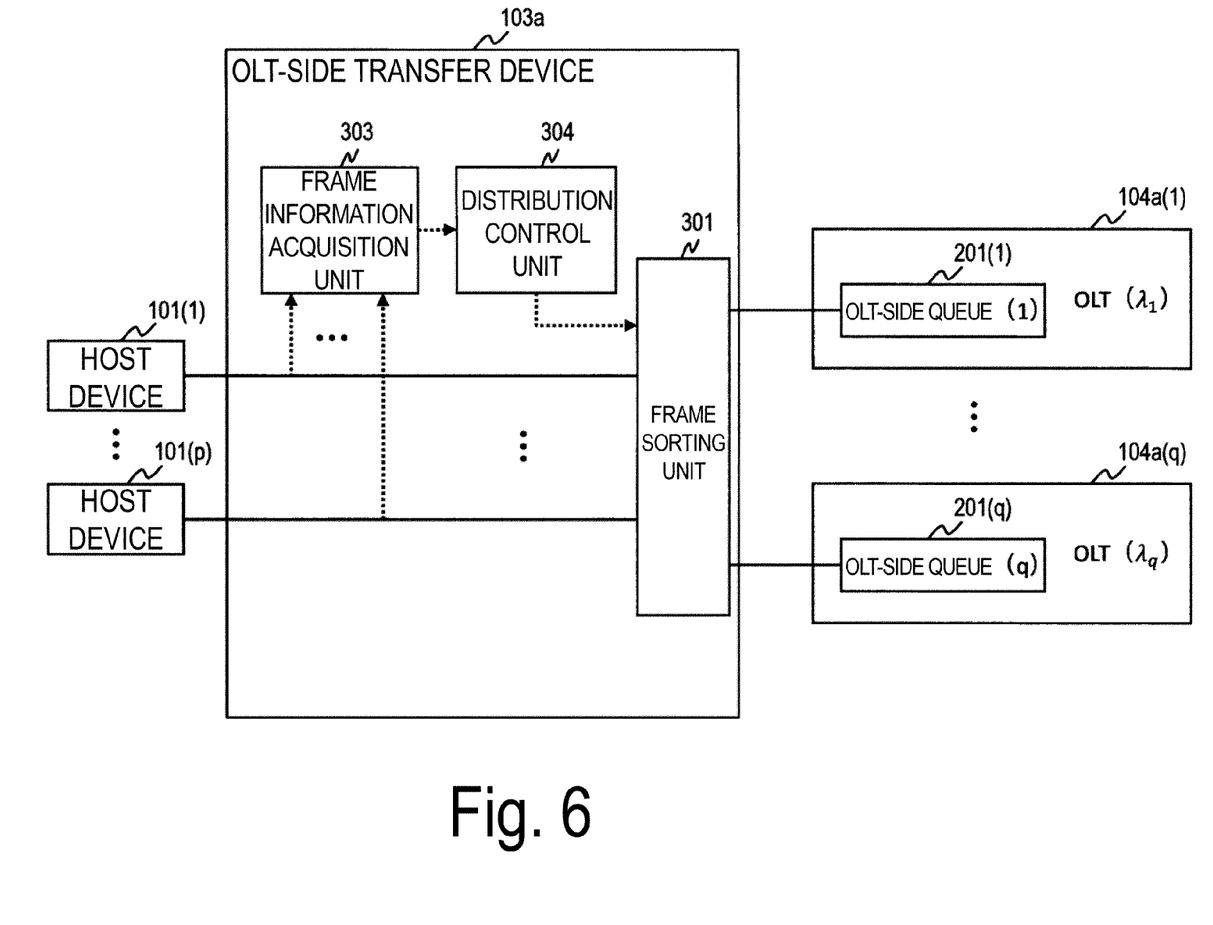
FIG. 6 is a diagram illustrating an example in which an OLT-side queue is provided in each OLT.

FIG. 6 illustrates an example in which the OLT-side queues 201 are provided in the OLTs 104. In an OLT-side transfer device 103a illustrated in FIG. 6, there is no OLT-side queue 201 of the frame storage unit 302 of the OLT-side transfer device 103 illustrated in FIG. 5 and an OLT-side queue 201 is provided in each of OLTs 104a. A frame sorting unit 301 sorts downstream frames input from a host device 101 side into the OLT-side queues 201 in the OLTs 104a. Note that the other operations of the OLT-side transfer device 103a are the same as those of the OLT-side transfer device 103 illustrated in FIG. 5.

Frame Transfer Process Common to Embodiments

Next, a process in which the OLT-side transfer device 103 transfers downstream frames, which is common to the first to fourth embodiments, will be described.

Figure 7:
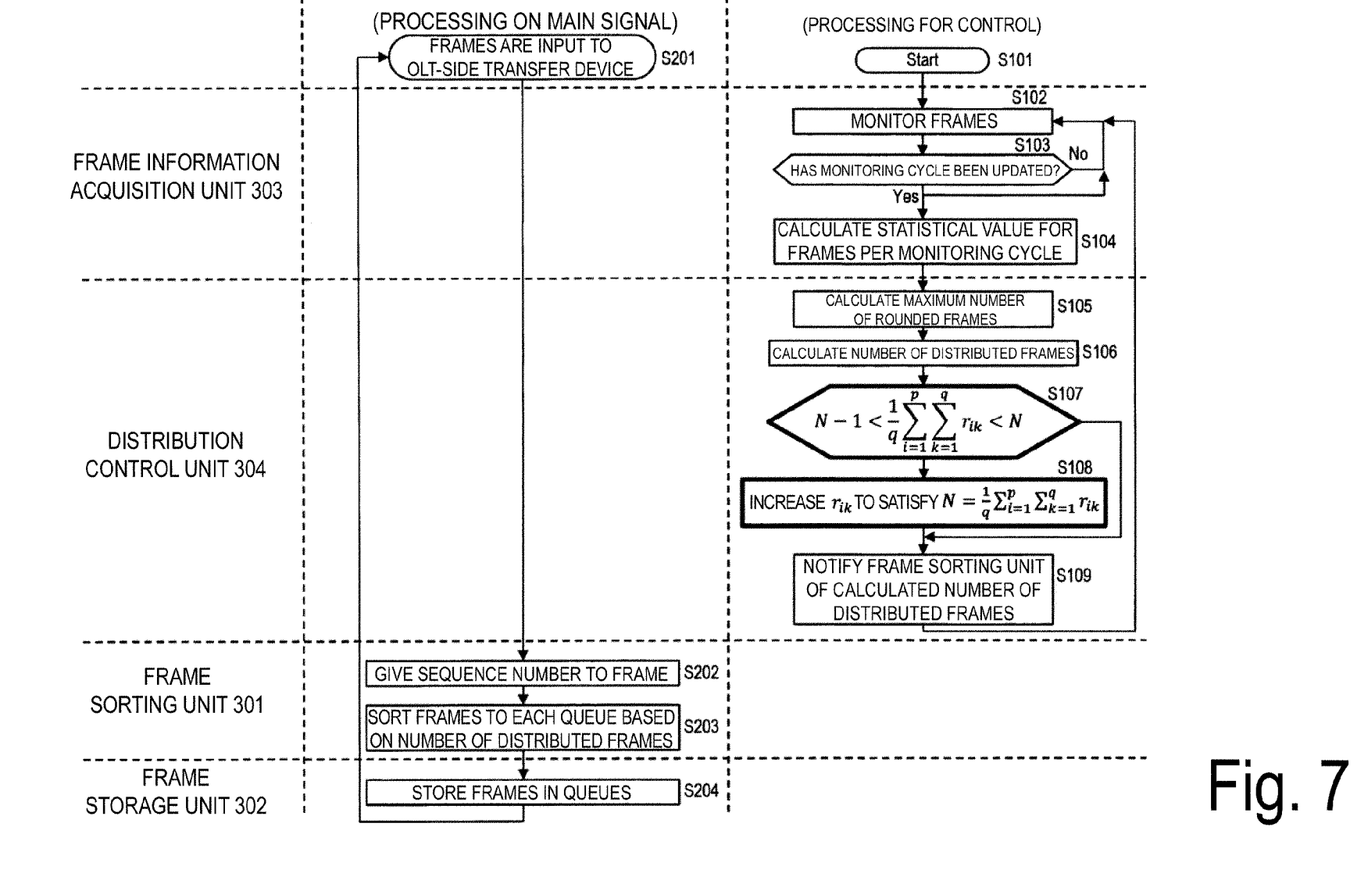
FIG. 7 is a diagram illustrating an example of processing of the OLT-side transfer device transferring downstream frames.

FIG. 7 illustrates an example of a process in which the OLT-side transfer device 103 transfers downstream frames. Note that, in FIG. 7, this process will be described by dividing it into processing on a main signal and processing for control. Here, the processing on a main signal is performed by the frame sorting unit 301 and the frame storage unit 302 of the OLT-side transfer device 103 described in FIG. 5. Furthermore, the processing for control is performed by the frame information acquisition unit 303 and the distribution control unit 304 of the OLT-side transfer device 103 described in FIG. 5. Note that, in the case of the OLT-side transfer device 103a illustrated in FIG. 6, only placement of the OLT-side queues 201 is different and the process can be performed in the same manner as well.

First, the processing for control will be described.

In step S101, the system with the OLT-side transfer device 103 according to the present embodiment starts operating.

In step S102, the frame information acquisition unit 303 monitors frames received from the host devices 101.

In step S103, the frame information acquisition unit 303 determines whether the monitoring cycle has been updated. When the monitoring cycle has been updated, the process proceeds to processing of step S104, and when the monitoring cycle has not been updated, the process returns to the processing of step S102 to repeat the same processing.

In step S104, when the monitoring cycle has been updated, the frame information acquisition unit 303 calculates a statistical value for frames for each ended monitoring cycle while keeping monitoring the frames.

In step S105, the distribution control unit 304 uses the statistical value calculated in step S104 to calculate the maximum number of rounded frames in accordance with the equation (1) described above.

In step S106, the distribution control unit 304 calculates the number of distributed frames in accordance with the equation (2) described above based on the maximum number of rounded frames calculated in step S105.

In step S107, the distribution control unit 304 determines whether the relationship (5) holds between the maximum number of rounded frames and the number of distributed frames. When the relationship (5) holds, the process proceeds to processing of next step S108, and when it is not satisfied, the process proceeds to processing of step S109.

In step S108, the distribution control unit 304 calculates the number of distributed frames to be increased so as to satisfy the equation (4) in each PON-IF, and determines a specific host device 101 among the host devices 101(1) to the host device 101(p) to increase the number of distributed frames in the host device 101. Here, as the specific host device 101, any one of a host device 101 having the minimum traffic volume described in the first embodiment, a host device 101 having the smallest number of distributed frames $r_{ik}$ determined to satisfy the equation (2) described in the second embodiment, randomly selected one host device 101 described in the third embodiment, and a plurality of randomly selected host devices 101 described in the fourth embodiment is determined. Then, the number of distributed frames in the determined host device(s) 101 is increased. However, the distribution control unit 304 sets the number of distributed frames to 0 or 1 until the frame information acquisition unit 303 calculates the number of frames per monitoring cycle and the statistical value of the maximum frame sizes in the monitoring cycle in the initial state.

In step S109, the distribution control unit 304 notifies the frame sorting unit 301 of the number of distributed frames calculated in step S106.

As described above, each unit of the OLT-side transfer device 103 repeatedly performs the operation described above at each monitoring cycle.

Next, processing on a main signal will be described.

In step S201, frames are input from the host devices 101 to the OLT-side transfer device 103.

In step S202, the frame sorting unit 301 gives sequence numbers to the frames input from the host devices 101.

In step S203, the frame sorting unit 301 sorts the frames with the sequence numbers given in step S202 into the OLT-side queues 201 in the frame storage unit 302 based on the number of distributed frames determined by the distribution control unit 304.

In step S204, the frame storage unit 302 stores the frames sorted by the frame sorting unit 301 in the OLT-side queues 201.

As described above, the OLT-side transfer device 103 repeatedly performs the operation described above at each frame input.

Here, the frame storage unit 302 sequentially outputs the frames stored in each of the queues and transfers the frames to the OLTs 104. Then, the frames transferred to each of the OLTs 104 are transferred to each of the ONUs 106 serving as destinations. Furthermore, the frames transferred to each of the ONUs 106 are transferred to the ONU-side transfer devices 108 connected to the ONUs 106.

The OLT-side transfer devices 103 according to the embodiments can reduce the required memory size and power consumption to sort frames into a plurality of PON-IFs to satisfy a desired delay requirement of downstream frames in a communication system in which a plurality of PONs are applied to frame transfer between the host devices 101 and the subordinate devices 102.

Note that the transfer methods for downstream frames performed by the OLT-side transfer devices 103 described in the embodiments can also be realized by a computer and a program, and the program can be recorded in a recording medium or provided through a network.

REFERENCE SIGNS LIST

101 Host device
102 Subordinate device
103, 103a, 113 OLT-side transfer device
104, 104a, 114 OLT
105, 115 Optical splitter
106, 116 ONU
107 Wavelength multiplexing filter
108 ONU-side transfer device
201 OLT-side queue
301, 311 Frame sorting unit
302 Frame storage unit
303 Frame information acquisition unit
304 Distribution control unit

The invention claimed is:

1. A transfer device comprising:
a processor; and
a storage medium having computer program instructions stored thereon, when executed by the processor, perform to:
monitor, in a communication system to which a network with a PON configuration including a plurality of OLTs between host devices and subordinate devices is applied, downstream frames input from the host devices between the host devices and the OLTs and calculate a statistical value of the downstream frames per a fixed cycle predetermined;

store the downstream frames input from the host devices in a plurality of queues;

input the downstream frames to the plurality of queues; and determine the number of frames to be sequentially input to the plurality of queues in the frame sorting process and increase a value of the number of distributed frames of at least one of the host devices input to an OLT, the OLT having a smaller value of a total number of frames input from all the host devices than a maximum number of rounded frames obtained by dividing a value of a total number of frames input until the frames of all the host devices take turns around the plurality of queues by the number of OLTs.

2. The transfer device according to claim 1, wherein when the number of host devices is p, the number of OLTs is q, a minimum integer exceeding a number obtained by dividing a value of a total number of frames input until the frames of all the host devices take turns around the plurality of queues by the number of OLTs is N, an optical communication speed in a PON section is B, a speed at which a host device i (i is an integer from 1 to p) outputs downstream frames is Ri, the statistical value of the number of downstream frames per the fixed cycle of the host device i is ni, the statistical value of maximum values of downstream frame sizes per the fixed cycle is s, a predetermined delay upper limit is y, and the number of distributed frames of the host device i that the frame sorting unit sequentially inputs to the queue connected to a k-th OLT (k is an integer from 1 to q) is nk, the distribution control unit determines the N to satisfy the following equation

[Math. 9]

$$N = \left\lceil \frac{1}{q} \sum_{i=1}^{p} \left\lceil \frac{NR_i n_i s}{(n_i - 1)Bs + yBR_i - (N-1)R_i s} \right\rceil \right\rceil,$$

determines the nk to satisfy the following equation based on the determined N

[Math. 10]

$$\sum_{k=1}^{q} r_{ik} = \left\lceil \frac{NR_i n_i s}{(n_i - 1)Bs + yBR_i - (N-1)R_i s} \right\rceil,$$

and when between the N and the nk, the following condition

[Math. 11]

$$N - 1 < \frac{1}{q} \sum_{i=1}^{p} \sum_{k=1}^{q} r_{ik} < N$$

holds, for the k-th OLT having a value other than 0 for the following expression

[Math. 12]

$$N - \sum_{i=1}^{p} r_{ik},$$

increases a value of the $r_{ik}$ of at least one of the host devices input to the OLT.

3. The transfer device according to claim 1, wherein the computer program instructions further perform to increases a value of the number of distributed frames of any one of the host device having a minimum traffic volume, the host device having a minimum number of distributed frames, the host device having a maximum traffic volume, the host device having a maximum number of distributed frames, and at least one of the host devices randomly selected.

4. A transfer method comprising:

a frame information acquisition process of monitoring, in a communication system to which a network with a PON configuration including a plurality of OLTs between host devices and subordinate devices is applied, downstream frames input from the host devices between the host devices and the OLTs and calculating a statistical value of the downstream frames per a fixed cycle predetermined;

a frame storage process of storing the downstream frames input from the host devices in a plurality of queues;

a frame sorting process of inputting the downstream frames to the plurality of queues; and a distribution control process of determining the number of frames to be sequentially input to the plurality of queues in the frame sorting process and increasing the number of distributed frames of at least one of the host devices input to an OLT, the OLT having a smaller value of a total number of frames input from all the host devices than a maximum number of rounded frames obtained by dividing a value of a total number of frames input until the frames of all the host devices take turns around the plurality of queues by the number of OLTs.

5. The transfer method according to claim 4, wherein in the distribution control process, when the number of host devices is p, the number of OLTs is q, a minimum integer exceeding a number obtained by dividing a value of a total number of frames input until the frames of all the host devices take turns around the plurality of queues by the number of OLTs is N, an optical communication speed in a PON section is B, a speed at which a host device i (i is an integer from 1 to p) outputs downstream frames is Ri, the statistical value of the number of downstream frames per the fixed cycle of the host device i is ni, the statistical value of maximum values of downstream frame sizes per the fixed cycle is s, a predetermined delay upper limit is y, and the number of distributed frames of the host device i that are sequentially input to the queue connected to a k-th OLT (k is an integer from 1 to q) in the frame sorting process is rik, N is determined to satisfy the following equation

[Math. 9]
$$N = \left\lceil \frac{1}{q}\sum_{i=1}^{p}\left\lceil \frac{NR_i n_i s}{(n_i - 1)Bs + yBR_i - (N-1)R_i s} \right\rceil \right\rceil,$$

$r_{ik}$ is determined to satisfy the following equation based on the determined N

[Math. 10]
$$\sum_{k=1}^{q} r_{ik} = \left\lceil \frac{NR_i n_i s}{(n_i - 1)Bs + yBR_i - (N-1)R_i s} \right\rceil,$$

and
when between the N and the rik, the following condition

[Math. 11]
$$N - 1 < \frac{1}{q}\sum_{i=1}^{p}\sum_{k=1}^{q} r_{ik} < N$$

holds,
for the k-th OLT having a value other than 0 for the following expression

[Math. 12]
$$N - \sum_{i=1}^{p} r_{ik},$$

increases a value of the $r_{ik}$ of at least one of the host devices input to the OLT.

6. The transfer method according to claim 4, wherein in the distribution control process, a value of the number of distributed frames of any one of the host device having a minimum traffic volume, the host device having a minimum number of distributed frames, the host device having a maximum traffic volume, the host device having a maximum number of distributed frames, and at least one of the host devices randomly selected is increased.

7. A transfer program causing a computer to execute processes performed by the transfer method described in claim 4.

\* \* \* \* \*